(12) United States Patent
Kim

(10) Patent No.: US 11,172,311 B2
(45) Date of Patent: Nov. 9, 2021

(54) SPEAKER AND DISPLAY APPARATUS INCLUDING THE SAME

(71) Applicant: LG Display Co., Ltd., Seoul (KR)

(72) Inventor: SeonMan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 9 days.

(21) Appl. No.: 16/540,516

(22) Filed: Aug. 14, 2019

(65) Prior Publication Data

US 2020/0059735 A1  Feb. 20, 2020

(30) Foreign Application Priority Data

Aug. 17, 2018 (KR) .................. 10-2018-0096332

(51) Int. Cl.
*H04R 17/00* (2006.01)
*H04R 1/02* (2006.01)
*H04M 1/03* (2006.01)
*H04R 1/28* (2006.01)

(52) U.S. Cl.
CPC .......... *H04R 17/005* (2013.01); *H04M 1/035* (2013.01); *H04R 1/02* (2013.01); *H04R 1/2811* (2013.01); *H04R 2400/03* (2013.01); *H04R 2400/11* (2013.01)

(58) Field of Classification Search
CPC ........ H04R 17/00; H04R 17/01; H04R 17/02; H04R 17/03; H04R 17/04; H04R 17/005; H04R 17/08; H04R 17/025; H04R 17/06; H04R 17/10
USPC ........ 381/173, 190, 114; 310/322, 324, 328, 310/334
See application file for complete search history.

(56) References Cited

U.S. PATENT DOCUMENTS

| | | | |
|---|---|---|---|
| 6,531,806 B1 * | 3/2003 | Daidai ................. | H03H 9/1035 310/320 |
| 9,591,389 B2 | 3/2017 | Horii et al. | |
| 2007/0200467 A1 * | 8/2007 | Heydt .................... | H04R 19/02 310/311 |
| 2010/0261023 A1 * | 10/2010 | Ravnaas ................... | E04B 1/86 428/448 |
| 2011/0002485 A1 * | 1/2011 | Onishi ................. | B06B 1/0603 381/190 |

(Continued)

FOREIGN PATENT DOCUMENTS

| | | |
|---|---|---|
| CN | 104769498 A | 7/2015 |
| CN | 105122839 A | 12/2015 |

OTHER PUBLICATIONS

Sheu, et al., Influence of bonding glues on the vibration of piezoelectric fans, Sensors and Actuators A 148 (2008) pp. 151-121.

(Continued)

*Primary Examiner* — Alexander Krzystan
*Assistant Examiner* — Julie X Dang
(74) *Attorney, Agent, or Firm* — Morgan, Lewis & Bockius LLP

(57) ABSTRACT

A speaker includes: a vibration plate, a piezoelectric member on a surface of the vibration plate, and a first adhesive member between the vibration plate and the piezoelectric member, wherein: the piezoelectric member is a unimorph piezoelectric member, and the first adhesive member has a high elastic modulus, or the piezoelectric member is a bimorph piezoelectric member, and the first adhesive member has a low elastic modulus.

12 Claims, 7 Drawing Sheets

(56) References Cited

U.S. PATENT DOCUMENTS

| | | | | |
|---|---|---|---|---|
| 2013/0321299 | A1* | 12/2013 | Kim | G06F 3/041 |
| | | | | 345/173 |
| 2014/0063600 | A1* | 3/2014 | Sharp | G02B 27/48 |
| | | | | 359/446 |
| 2015/0334491 | A1* | 11/2015 | Horii | H04R 1/02 |
| | | | | 381/190 |
| 2016/0007123 | A1* | 1/2016 | Mizuta | H04R 1/028 |
| | | | | 381/333 |
| 2016/0050498 | A1* | 2/2016 | Ogata | H04R 17/10 |
| | | | | 381/190 |

OTHER PUBLICATIONS

First Notification of Office Action dated Sep. 2, 2020, issued in corresponding Chinese Patent Application No. 201910720139.6. Note: US 2016/0007123, US 2011/0002485, and US 2013/0321299 cited within have been cited by the U.S. Examiner in the present application.

\* cited by examiner

SPEAKER AND DISPLAY APPARATUS INCLUDING THE SAME

CROSS-REFERENCE TO RELATED APPLICATION(S)

This application claims the benefit of and priority to Korean Patent Applications No. 10-2018-0096332, filed on Aug. 17, 2018, the entirety of which is hereby incorporated by reference.

BACKGROUND

1. Technical Field

The present disclosure relates to a speaker and a display apparatus including the same.

2. Discussion of the Related Art

Generally, piezoelectric devices are devices having a characteristic of converting electrical energy into mechanical energy or converting mechanical energy into electrical energy. For example, when pressure is applied to a piezoelectric device, a voltage is generated in the piezoelectric device (e.g., a piezoelectric effect), and when a voltage is applied to the piezoelectric device, an internal pressure of the piezoelectric device varies to increase or decrease a volume or a length of the piezoelectric (e.g., an inverse piezoelectric effect). Piezoelectric devices each include a piezoelectric layer and an electrode on the piezoelectric layer. A mechanical displacement occurs based on a voltage applied to the piezoelectric layer through the electrode.

Various components, such as piezoelectric speakers and vibration devices, may be manufactured with a piezoelectric device. Piezoelectric speakers are components that acoustically change a mechanical motion of a piezoelectric device by using a vibration plate to generate a sound of a desired frequency band. In comparison with dynamic speakers, piezoelectric speakers are thin and lightweight, and have low power consumption. Thus, piezoelectric speakers may be applied to electronic devices, such as smartphones, requiring a small size, a thin thickness, and lightness. However, because piezoelectric speakers are insufficient in regard to low-pitched sound, it is desirable to improve a low-pitched sound characteristic.

SUMMARY

Accordingly, the present disclosure is directed to a speaker and a display apparatus including the same that substantially obviate one or more of the issues due to limitations and disadvantages of the related art.

When a speaker is configured to be coupled to a vibration plate, the inventor has performed various experiments for decreasing a problem in which a crack in a piezoelectric member configuring the speaker occurs due to an external impact applied to the vibration plate or deformation of the vibration plate. Therefore, the inventor has invented a speaker and a display apparatus including the same, in which a reinforcement member is provided on one surface of a piezoelectric member to secure robustness of the piezoelectric member. Also, to improve a low-pitched sound characteristic, which is reduced by applying a reinforcement member, by applying the reinforcement member disposed adjacent to a piezoelectric member or an adhesive member having an elastic modulus between a vibration plate and the piezoelectric member based on a polarization direction of the piezoelectric member, the inventor has invented a speaker with a sound pressure characteristic enhanced in a sound band including a low-pitched sound band and a display apparatus including the speaker.

An aspect of the present disclosure is to provide a speaker and a display apparatus including the same, in which a reinforcement member is provided on one surface of a piezoelectric member to secure robustness of the piezoelectric member.

Another aspect of the present disclosure is to provide a speaker with a sound pressure characteristic enhanced in a broad sound band, including a low-pitched sound band, and a display apparatus including the speaker.

Another aspect of the present disclosure is to provide a display apparatus in which a panel of the display apparatus vibrates by using a thin speaker to generate a sound, thereby realizing a slim design.

Another aspect of the present disclosure is to provide a display apparatus in which a speaker included in a display apparatus has a high-pitched sound pressure characteristic in a broad sound band including a low-pitched sound band, thereby providing an enhanced sound to a user.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a speaker, including: a vibration plate, a piezoelectric member on a surface of the vibration plate, and a first adhesive member between the vibration plate and the piezoelectric member, wherein: the piezoelectric member is a unimorph piezoelectric member, and the first adhesive member has a high elastic modulus, or the piezoelectric member is a bimorph piezoelectric member, and the first adhesive member has a low elastic modulus.

In another aspect, there is provided a speaker, including: a piezoelectric member, a first reinforcement member on an upper surface of the piezoelectric member, a second reinforcement member on a lower surface of the piezoelectric member, a first adhesive member between the first reinforcement member and the piezoelectric member, and a second adhesive member between the second reinforcement member and the piezoelectric member, wherein, when the piezoelectric member is a unimorph piezoelectric member, at least one of the first adhesive member and the second adhesive member has a high elastic modulus, and wherein, when the piezoelectric member is a bimorph piezoelectric member, at least one of the first adhesive member and the second adhesive member has a low elastic modulus.

In another aspect, there is provided a speaker, including: a vibration plate, a piezoelectric member on a surface of the vibration plate, a reinforcement member on at least one of an upper surface and a lower surface of the piezoelectric member, and an adhesive member in at least one of a portion between the vibration plate and the reinforcement member and a portion between the piezoelectric member and the reinforcement member, the adhesive member having a certain elastic modulus, wherein a vibration generated by the piezoelectric member is transferred to the vibration plate.

In another aspect, there is provided a display apparatus, including: a display panel configured to display an image, and a speaker on a rear surface of the display panel, the speaker being configured to vibrate the display panel to generate sound, the speaker including: a piezoelectric member, a reinforcement member on at least one of an upper surface of the piezoelectric member and a lower surface of the piezoelectric member, and an adhesive member in at least one of: a portion between the display panel and the reinforcement member, and a portion between the piezoelectric member and the reinforcement member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
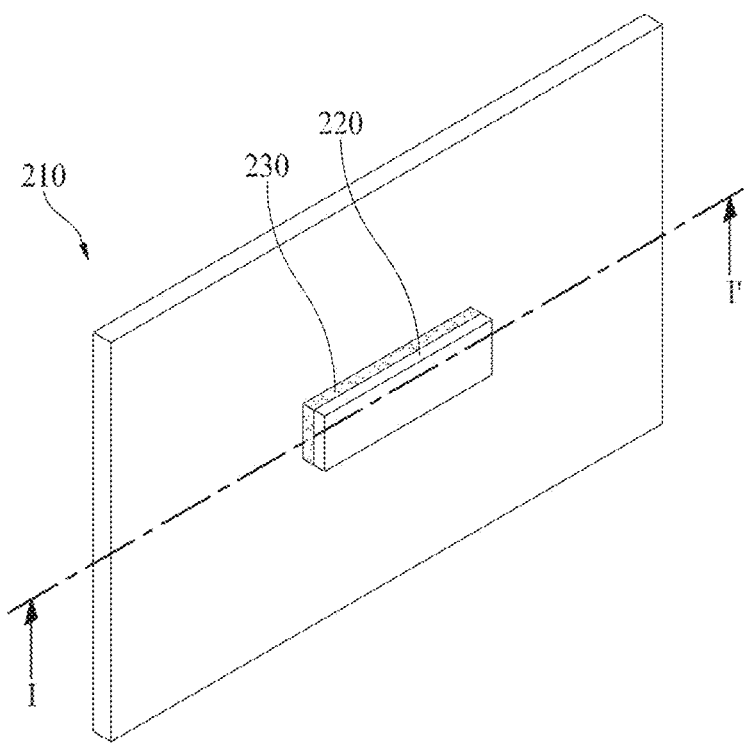
FIG. 1 illustrates a speaker according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a speaker and a display apparatus including the same according to an embodiment of the present disclosure will be described in detail with reference to the accompanying drawings.

Figure 2:
FIG. 2 is a cross-sectional view taken along line I-I' illustrated in FIG. 1.

FIG. 1 illustrates a speaker according to an embodiment of the present disclosure. FIG. 2 is a cross-sectional view taken along line I-I' illustrated in FIG. 1.

With reference to FIGS. 1 and 2, the speaker according to an embodiment of the present disclosure may include a vibration plate 210, a piezoelectric member 220 on one surface of the vibration plate 210, and an adhesive member 230 between the vibration plate 210 and the piezoelectric member 220. The vibration plate 210 may receive a mechanical displacement generated by the piezoelectric member 220 to generate a vibration, and may generate a compression wave toward a forward portion to reproduce or generate sound. The vibration plate 210 may include at least one of metal, ceramic, and plastic, but is not limited thereto. For example, the vibration plate 210 may include carbon nanotubes, tempered glass, and/or hard plastic, but is not limited thereto. Also, the vibration plate 210 may have a frequency characteristic of a low-pitched sound band, may be is enhanced as a Young's modulus becomes lower. Also, when the vibration plate 210 is applied to a display apparatus, the vibration plate 210 may be a display panel.

In the speaker according to an embodiment of the present disclosure, the piezoelectric member 220 may generate a mechanical displacement with electrical energy applied from the outside. The piezoelectric member 220 may include a piezoelectric material that may vibrate according to an electric field. Here, the piezoelectric material may have a characteristic in which, as pressure is applied to or twisting occurs in a crystalline structure due to an external force, a potential difference is caused by dielectric polarization based on a relative position change of a positive (+) ion and a negative (−) ion, and vibration occurs due to an electric field based on an applied voltage. For example, the piezoelectric material layer may have a square or rectangular hexahedron structure, but is not limited thereto.

The piezoelectric member 220, according to an embodiment of the present disclosure, may include a polymer material-containing piezoelectric material, a thin-film material-containing piezoelectric material, a composite material-containing piezoelectric material, or a single crystalline ceramic or polycrystalline ceramic-containing piezoelectric material. Examples of the polymer material-containing piezoelectric material include polyvinylidene fluoride (PVDF), polyvinylidene fluoride trifluoroethylene P(VDF-TrFe), and P(VDFTeFE). Examples of the thin-film material-containing piezoelectric material may include zinc oxide (ZnO), cadmium sulfide (CdS), and aluminum nitride (AlN). Examples of the composite material-containing piezoelectric material include one or more of: PZT-PVDF, PZT-silicone rubber, PZT-epoxy, PZT-foam polymer, and PZT-foam urethane. Examples of the single crystalline ceramic-containing piezoelectric material include one or more of: alpha-aluminum phosphate ($\alpha$-AlPO$_4$), alpha-silicon dioxide ($\alpha$-SiO$_2$), lithium niobate (LiNbO$_3$), terbium molydbate (Tb$_2$(MoO$_4$)$_3$), lithium borate (or lithium tetraborate) (Li$_2$B$_4$O$_7$), and ZnO. Examples of the polycrystalline ceramic-containing piezoelectric material include a PZT-based material, a PT-based material, a PZT-complex perovskite-based material, and barium titanate (BaTiO$_3$).

The speaker, according to an embodiment of the present disclosure, may further include an upper electrode and a lower electrode for receiving an electrical signal applied from an external driving circuit to an upper surface and a lower surface of the piezoelectric member 220, and may generate a mechanical vibration or displacement according to an electrical signal applied through the upper electrode and the lower electrode. The upper electrode and the lower electrode may each include an opaque metal material, which is relatively low in resistance and has a good heat dissipation characteristic, but are not limited thereto. For example, the upper electrode and the lower electrode may each include a transparent conductive material or a conductive polymer material.

The piezoelectric member 220 may be configured with a single layer or as a multi-layer structure. The piezoelectric member 220 may have a structure in which one or more piezoelectric material layers having a piezoelectric characteristic are stacked. When an alternating current (AC) voltage is applied to the upper electrode and the lower electrode of the piezoelectric member 220, the piezoelectric member 220 may alternately and repeatedly expand and contract based on an inverse piezoelectric effect of the piezoelectric material layer, thereby generating a vibration based on a bending phenomenon in which a bending direction is alternately changed.

As described above, when a polarity of a driving voltage applied to the piezoelectric member 220 is changed by applying an AC voltage, a process, in which the piezoelectric member 220 is convexly bent and concavely bent with respect to a center surface of the piezoelectric member 220, may be repeated, and the piezoelectric member 220 may vibrate based on the alternating repetition of the convex bending and the concave bending. For example, as a frequency of the AC voltage increases, a vibration frequency of the piezoelectric member 220 may increase.

Moreover, the piezoelectric member 220 may vibrate based on a process in which the supply and cutoff of a direct current (DC) voltage are alternately repeated. For example, the piezoelectric member 220 may alternately repeat a process in which the piezoelectric member 220 is bent toward one side, and a process in which the piezoelectric member 220 restores to an original state without being bent, thereby generating a vibration of the piezoelectric member 220.

The piezoelectric member 220 may be configured with a piezoelectric material layer formed of a single layer. Therefore, in the piezoelectric member 220 including the piezoelectric material layer corresponding to a single layer, a vibration direction may be identically formed in the piezoelectric member 220 based on an external electric field.

Moreover, the piezoelectric member 220 may be configured with a plurality of piezoelectric material layers, and the piezoelectric member 220 including the plurality of piezoelectric material layers may include a first piezoelectric group having an electric field polarization aligned in one direction, and at least one second piezoelectric layer group having an electric field polarization aligned in a direction opposite to that of the first piezoelectric layer group. For example, the first piezoelectric layer group and the second piezoelectric layer group may have different mechanical displacements and directions based on an AC voltage applied thereto.

When a piezoelectric member is configured with a plurality of piezoelectric material layers, a piezoelectric member having a multi-layer structure may be driven with a low voltage, unlike a piezoelectric device layer having a single-layer structure having the same thickness. The number of layers of the piezoelectric device layer may be selected based on a desired vibration level, and a piezoelectric member for piezoelectric speakers may be configured with any number of layers from several layers to tens of layers.

The piezoelectric member 220 may be a unimorph piezoelectric member or a bimorph piezoelectric member. This will be described below with reference to FIG. 3.

The piezoelectric member of FIG. 3 may include a single layer or a plurality of layers, and may form an electric field polarization aligned in one direction. Therefore, the piezoelectric member may have the same electric field polarization characteristic as described above.

Figure 3A:
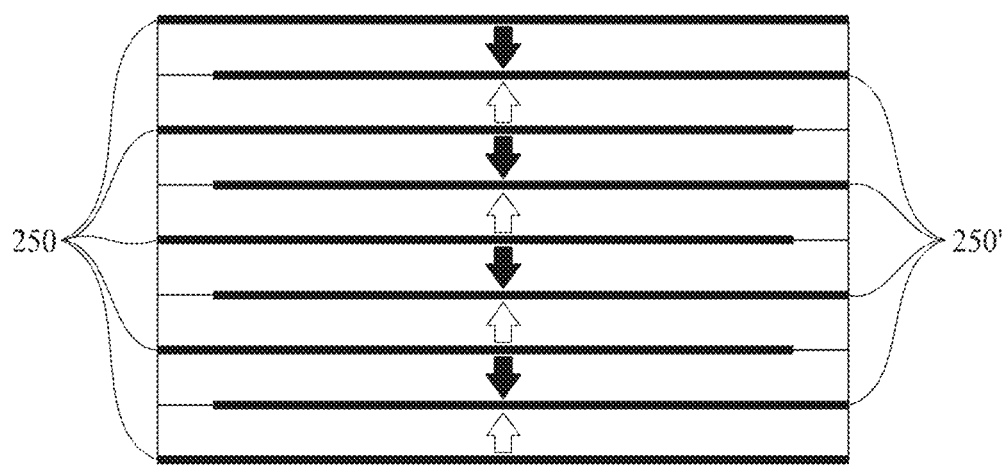
FIG. 3A is a cross-sectional view of an example of a unimorph piezoelectric member.

With reference to FIG. 3A, a polarization direction of each piezoelectric layer may be opposite to that of a piezoelectric layer adjacent thereto, one electrode 250 may be exposed at one (e.g., a first) side of a unimorph piezoelectric member, and another electrode 250' may be exposed at another (e.g., a second) side of the unimorph piezoelectric member. As described above, because a polarization direction of each piezoelectric layer is opposite to that of a piezoelectric layer adjacent thereto, when a positive (+) voltage is applied to the unimorph piezoelectric member based on the one electrode 250 and a negative (−) voltage is applied to the unimorph piezoelectric member based on the other electrode 250', the unimorph piezoelectric member may contract or expand in a lengthwise direction of the piezoelectric member.

Figure 3B:
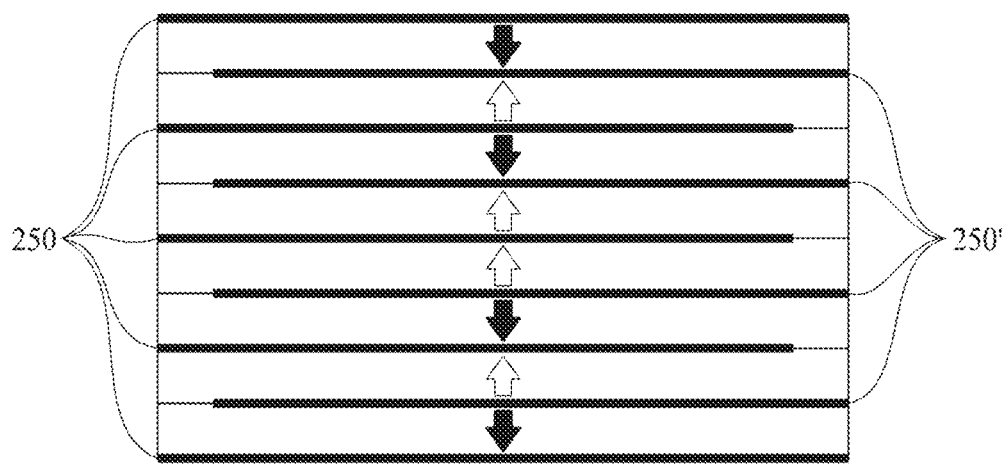
FIG. 3B is a cross-sectional view of an example of a bimorph piezoelectric member.

FIG. 3B is a cross-sectional view of an example of a bimorph piezoelectric member.

With reference to FIG. 3B, in a lowermost layer to a fourth layer of a piezoelectric member, a polarization direction of each piezoelectric layer may be provided as a direction opposite to that of a piezoelectric layer adjacent thereto, a polarization direction of a fifth piezoelectric layer may be provided as a direction the same as that of the fourth piezoelectric layer, and a polarization direction of each of fifth to eighth piezoelectric layers may be provided as a direction opposite to that of a piezoelectric layer adjacent thereto. When a polarization direction of a piezoelectric member is set as in FIG. 3B and a positive (+) voltage and a negative (−) voltage are applied based on electrodes 250 and 250', when the first to fourth piezoelectric layers of FIG. 3B expands or contracts in a lengthwise direction of the piezoelectric member, the fourth to eighth piezoelectric layers may expand or contract in a direction opposite to the first to fourth piezoelectric layers.

In FIGS. 3A and 3B, the piezoelectric member is illustrated as including eight layers that are sequentially stacked, but the number of piezoelectric layers is not limited thereto. For example, the piezoelectric member may include two piezoelectric layers, four piezoelectric layers, or sixteen piezoelectric layers.

Figure 4:
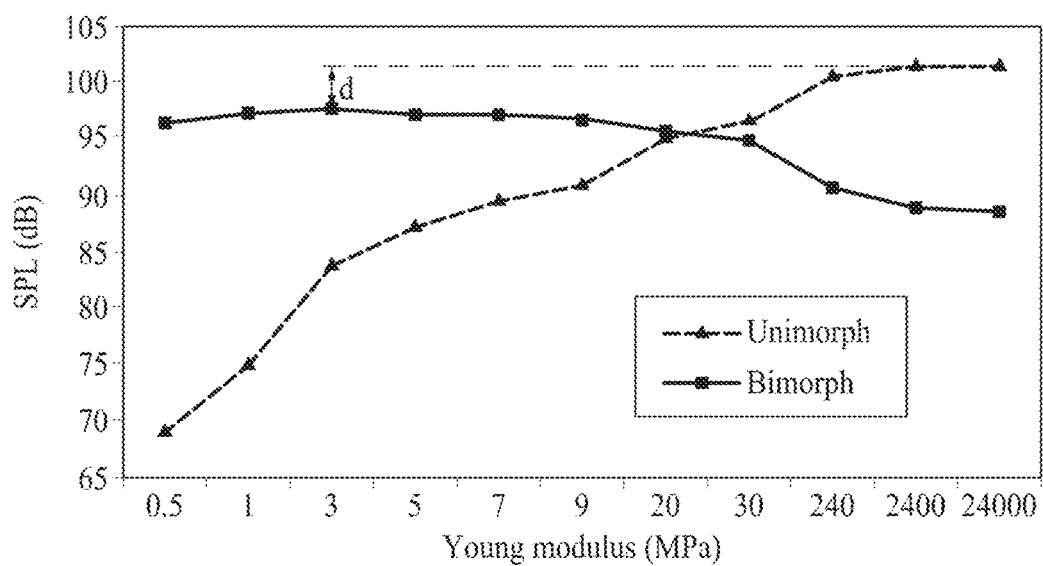
FIG. 4 is a graph showing experimental results of a sound pressure level with respect to a configuration of each of a vibration member and a piezoelectric member and an elastic modulus of an adhesive member when a reinforcement member is not provided in the speaker of FIG. 2.

FIG. 4 is a graph showing experimental results of a sound pressure level with respect to a configuration of each of a vibration member and a piezoelectric member and an elastic modulus of an adhesive member when a reinforcement member is not provided in the speaker of FIG. 2.

FIG. 4 shows a result obtained by measuring a sound pressure level at a position of 1 cm in a forward direction with respect to a vibration plate by using a sound pressure measurement apparatus. In FIG. 4, the abscissa axis (x-axis) represents a Young modulus (MPa), and the ordinate axis (y-axis) represents a sound pressure level (SPL) (dB).

With reference to FIG. 4, in a speaker to which a piezoelectric member 220 (illustrated as a triangle-dotted line), including piezoelectric material layers having the same electric field polarization characteristic (e.g., unimorph), is applied, it may be seen that, as an elastic modulus of an adhesive member between a vibration plate 210 and the piezoelectric member 220 increases, a sound pressure level is almost linearly enhanced. On the other hand, when a speaker includes a piezoelectric member (illustrated as a square-dotted line), including a first piezoelectric layer group and a second piezoelectric layer group having different polarization directions (e.g., bimorph), it may be seen that, as an elastic modulus of an adhesive member decreases, a sound pressure level increases.

Therefore, when a piezoelectric member is a unimorph piezoelectric member, a vibration-direction level of each of both sides of the piezoelectric member 220 may increase, but bending may not be performed, and a vibration transferred to the vibration plate 210 may decrease. Therefore, as an elastic modulus or a Young modulus of the adhesive member between the vibration plate 210 and the piezoelectric member 220 increases, a sound pressure level may be enhanced. Thus, a vibration of the vibration plate 210 may increase. For example, the elastic modulus of the adhesive member may be 25 MPa or more, and the adhesive member may have an elastic modulus having a range of 100 MPa to 1,000 MPa. The Young modulus may be the elastic modulus.

When the piezoelectric member 220 is a bimorph piezoelectric member, a vibration of a lowermost layer close to the vibration plate 210 may decrease compared to another layer provided in the lowermost layer. Thus, a vibration transferred to the vibration plate 210 may decrease. Therefore, as the elastic modulus or Young modulus of the adhesive member between the vibration plate 210 and the piezoelectric member 220 increases, a vibration of the vibration plate 210 may decrease. Thus, the elastic modulus of the adhesive member should be relatively low for increasing the vibration transferred to the vibration plate 210. For example, the elastic modulus of the adhesive member may be 0.1 MPa to 20 MPa.

Therefore, when the piezoelectric member of the speaker of FIG. 2 is a unimorph piezoelectric member, it may be seen that, when the elastic modulus of the adhesive member is about 3 GPa, the piezoelectric member realizes a highest sound pressure level. Also, when the piezoelectric member of the speaker of FIG. 2 is a bimorph piezoelectric member, it may be seen that a sound pressure level is about 4 dB lower than a maximum sound pressure level (for example, 100 dB) measured based on 3 MPa (labeled as 'd').

When the piezoelectric member 220 is formed of a piezoelectric ceramic that is high in brittleness, the piezoelectric member 220 may be easily broken down by an external impact due to the high brittleness. Therefore, a reinforcement member may be disposed on at least one of an upper surface or a lower surface of the piezoelectric member 220 to secure robustness of the piezoelectric member 220. For example, the reinforcement member may be disposed on at least one of the upper surface or the lower surface of the piezoelectric member 220 to absorb an external impact applied to the piezoelectric member 220. A Young modulus or an elastic modulus of the reinforcement member may be greater than the Young modulus or the elastic modulus of the adhesive member. For example, the Young modulus or the elastic modulus of the reinforcement member may be 1 GPa or more. For example, the Young modulus or the elastic modulus of the reinforcement member may be 200 GPa, but embodiments are not limited thereto. The reinforcement member may be formed of stainless steel, but is not limited thereto.

For example, the speaker according to an embodiment of the present disclosure may act as a reinforcement member that may enable the vibration plate 210 to absorb an external impact. Therefore, in a speaker according to another embodiment of the present disclosure, a reinforcement member may be disposed on only a lower surface of a piezoelectric member, but is not limited thereto. For example, when the speaker is applied to a display apparatus, the vibration plate 210 may be a display panel.

Figure 5:
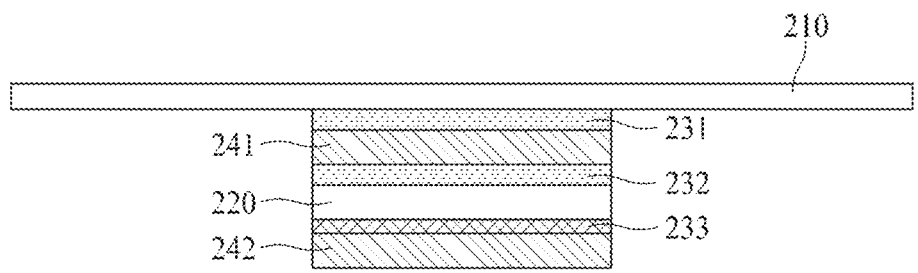
FIG. 5 is a cross-sectional view of a speaker according to another embodiment of the present disclosure.

FIG. 5 is a cross-sectional view of a speaker according to another embodiment of the present disclosure.

With reference to FIG. 5, the speaker according to another embodiment of the present disclosure may include a vibration plate 210, a piezoelectric member 220 on one surface of the vibration plate 210, a first reinforcement member 241 on an upper surface of the piezoelectric member 220, and a second reinforcement member 242 on a lower surface of the piezoelectric member 220. Also, the speaker according to another embodiment of the present disclosure may further include a first adhesive member 231 between the vibration plate 210 and the first reinforcement member 241, a second adhesive member 232 between the first reinforcement member 241 and the piezoelectric member 220, and a third adhesive member 233 between the piezoelectric member 220 and the second reinforcement member 242.

When a reinforcement member is provided, a problem, in which a low sound of the piezoelectric member 220 is reduced, may occur due to the reinforcement member. To enhance a sound of a low-pitched sound band, the inventor has recognized that materials of adhesive members should differ. As described above with reference to FIGS. 3A, 3B, and 4, the adhesive members may be configured to have different elastic moduli, based on a configuration of the piezoelectric member 220. Various experiments on this have been performed. This will be described below with reference to FIGS. 6 to 10.

Figure 6:
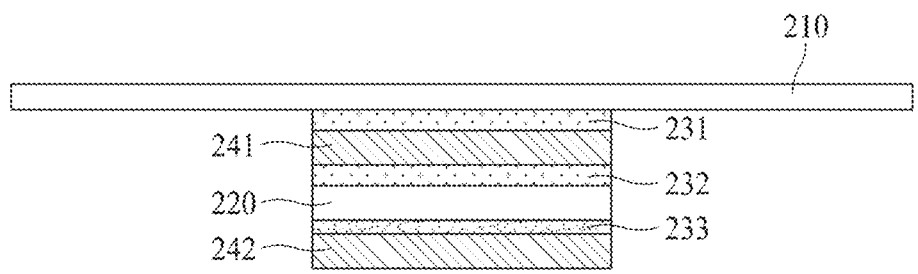
FIG. 6 is a cross-sectional view illustrating a speaker according to a first embodiment of the present disclosure.
Figure 7:
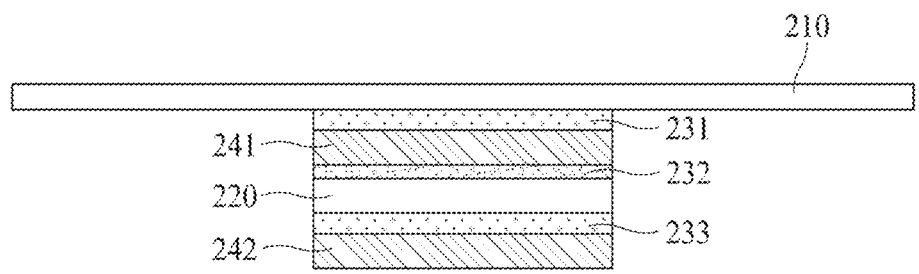
FIG. 7 is a cross-sectional view illustrating a speaker according to a second embodiment of the present disclosure.
Figure 8:
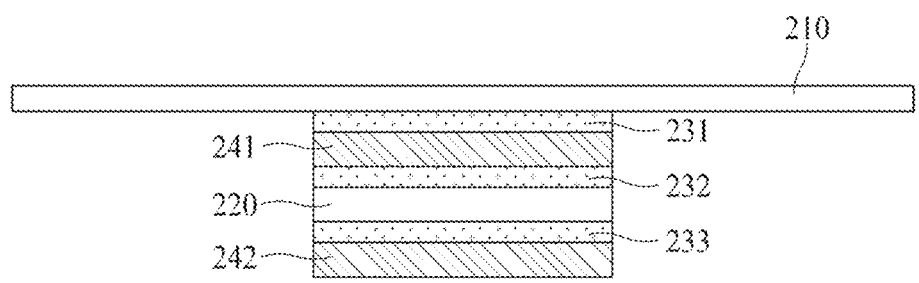
FIG. 8 is a cross-sectional view illustrating a speaker according to a third embodiment of the present disclosure.
Figure 9:
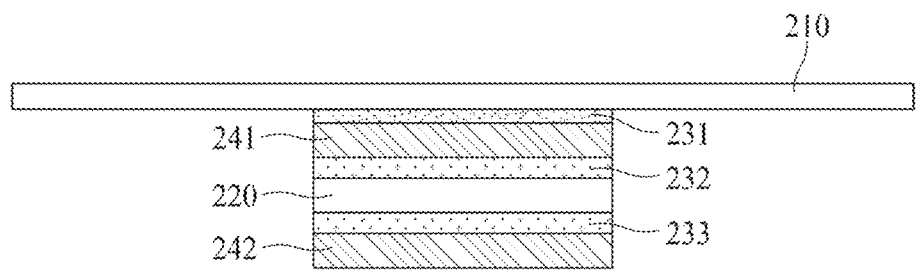
FIG. 9 is a cross-sectional view illustrating a speaker according to a fourth embodiment of the present disclosure.

FIG. 6 is a cross-sectional view illustrating a speaker according to a first embodiment of the present disclosure. FIG. 7 is a cross-sectional view illustrating a speaker according to a second embodiment of the present disclosure. FIG. 8 is a cross-sectional view illustrating a speaker according to a third embodiment of the present disclosure. FIG. 9 is a cross-sectional view illustrating a speaker according to a fourth embodiment of the present disclosure.

With reference to FIG. 6, the speaker according to the first embodiment of the present disclosure may include a first reinforcement member 241, a piezoelectric member 220, and a second reinforcement member 242, which may be disposed on a lower surface with respect to a vibration plate 210. The speaker according to the first embodiment of the present disclosure may include a first adhesive member 231 between the vibration plate 210 and the first reinforcement member 241, a second adhesive member 232 between the first reinforcement member 241 and the piezoelectric member 220, and a third adhesive member 233 between the piezoelectric member 220 and the second reinforcement member 242. Each of the first and second adhesive members 231 and 232 may be an adhesive member having a low elastic modulus, and the third adhesive member 233 may be an adhesive member having a high elastic modulus.

With reference to FIG. 7, the speaker according to the second embodiment of the present disclosure may include a first reinforcement member 241, a piezoelectric member 220, and a second reinforcement member 242, which may be disposed on a lower surface with respect to a vibration plate 210. The speaker according to the second embodiment of the present disclosure may include a first adhesive member 231 between the vibration plate 210 and the first reinforcement member 241, a second adhesive member 232 between the first reinforcement member 241 and the piezoelectric member 220, and a third adhesive member 233 between the piezoelectric member 220 and the second reinforcement member 242. Each of the first and third adhesive members 231 and 233 may be an adhesive member having a low elastic modulus, and the second adhesive member 232 may be an adhesive member having a high elastic modulus.

With reference to FIG. 8, the speaker according to the third embodiment of the present disclosure may include a first reinforcement member 241, a piezoelectric member 220, and a second reinforcement member 242, which may be disposed on a lower surface with respect to a vibration plate 210. The speaker according to the third embodiment of the present disclosure may include a first adhesive member 231 between the vibration plate 210 and the first reinforcement member 241, a second adhesive member 232 between the first reinforcement member 241 and the piezoelectric member 220, and a third adhesive member 233 between the piezoelectric member 220 and the second reinforcement member 242. Each of the first to third adhesive members 231 to 233 may be an adhesive member having a low elastic modulus.

With reference to FIG. 9, the speaker according to the fourth embodiment of the present disclosure may include a first reinforcement member 241, a piezoelectric member 220, and a second reinforcement member 242, which may be disposed on a lower surface with respect to a vibration plate 210. The speaker according to the fourth embodiment of the present disclosure may include a first adhesive member 231 between the vibration plate 210 and the first reinforcement member 241, a second adhesive member 232 between the first reinforcement member 241 and the piezoelectric member 220, and a third adhesive member 233 between the piezoelectric member 220 and the second reinforcement member 242. Each of the second and third adhesive members 232 and 233 may be an adhesive member having a low elastic modulus, and the first adhesive member 231 may be an adhesive member having a high elastic modulus.

Figure 10:
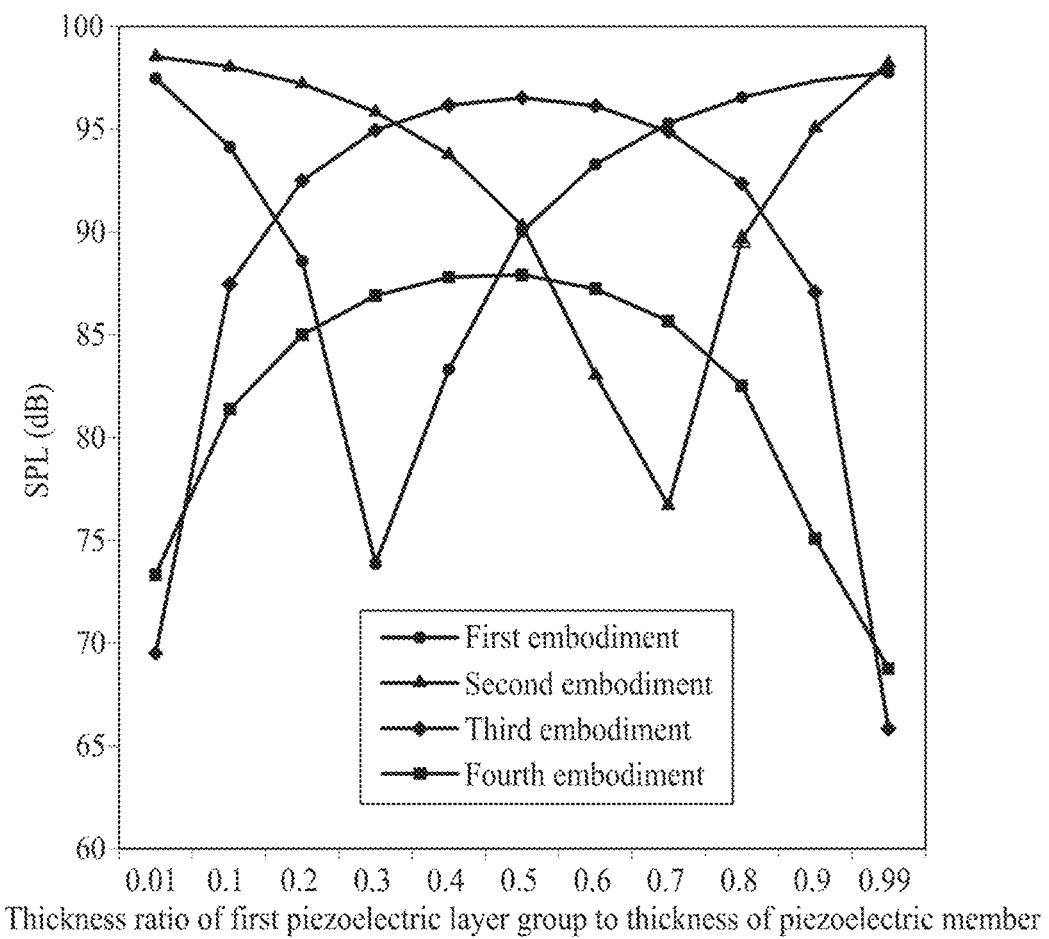
FIG. 10 is a graph showing experimental results of a sound pressure level with respect to a thickness ratio of a first piezoelectric layer group to a second piezoelectric layer group of a bimorph piezoelectric member in each of the speakers according to the first to fourth embodiments.

FIG. 10 is a graph showing experimental results of a sound pressure level with respect to a thickness ratio of a first piezoelectric layer group to a second piezoelectric layer group of a bimorph piezoelectric member in each of the speakers according to the first to fourth embodiments.

FIG. 10 shows experimental results of a sound pressure level while varying a thickness ratio of a first piezoelectric layer group to a second piezoelectric layer group of a bimorph piezoelectric member in each of the speakers according to the first to fourth embodiments in which a piezoelectric member is a bimorph piezoelectric member. For example, a sound pressure level characteristic of FIG. 10 has been measured at a distance of 1 cm to the front of a display panel by using a sound pressure measurement apparatus.

With reference to FIG. 10, each of the speakers according to the first embodiment of the present disclosure illustrated in the example of FIG. 6 and the speaker according to the second embodiment of the present disclosure illustrated in the example of FIG. 7 uses an adhesive member having a high elastic modulus as the third adhesive member or the second adhesive member, and uses an adhesive member having a low elastic modulus as the first adhesive member. In this case, in each of the speaker according to the first embodiment of the present disclosure and the speaker according to the second embodiment of the present disclosure, it may be shown that, when a thickness ratio of a first piezoelectric layer group of a piezoelectric member is highest (e.g., closer to '1' on the x-axis of FIG. 10) or is lowest (e.g., closer to '0' on the x-axis of FIG. 10) or the piezoelectric member is similar to a unimorph piezoelectric member, a highest sound pressure level is observed. Therefore, in the speaker according to another embodiment of the present disclosure, when a piezoelectric member is a unimorph piezoelectric member or is similar to a unimorph piezoelectric member, and the second adhesive member or the third adhesive member, each disposed between the piezoelectric member and the first and second reinforcement members, is an adhesive member having a high elastic modulus, a vibration transferred to a vibration plate may increase. A unimorph piezoelectric member may contract or expand in the same lengthwise direction. Thus, a vibration-direction level toward both sides may be amplified.

However, when an elastic modulus of an adhesive member adjacent to a piezoelectric member is low, a vibration transferred to the first reinforcement member or the second reinforcement member adjacent to each other may decrease. Thus, a vibration transferred to a vibration plate may be reduced. Alternatively, when an adhesive member having a high elastic modulus is disposed between a first reinforcement member and a piezoelectric member, and an adhesive member having a low elastic modulus is disposed between a piezoelectric member and a second reinforcement member, the same effect may be obtained.

In each of the speaker according to the first embodiment of the present disclosure illustrated in FIG. 6 (shown as a circle-dotted line in FIG. 10) and the speaker according to the second embodiment of the present disclosure illustrated in FIG. 7 (shown as a triangle-dotted line in FIG. 10), it may be shown that, when a thickness ratio of a first piezoelectric layer group of a piezoelectric member is 0.3, and a thickness ratio of a second piezoelectric layer group of the piezoelectric member is 0.7 or when the piezoelectric member is a piezoelectric member similar to a bimorph piezoelectric member, it may be shown that a low sound pressure level is observed. In a speaker according to another embodiment of the present disclosure, when a piezoelectric member is a bimorph piezoelectric member, when each of the second adhesive member and the third adhesive member, each disposed between the piezoelectric member and the first and second reinforcement members, is an adhesive member having a high elastic modulus, a vibration of the first piezoelectric layer group or the second piezoelectric layer group may be prevented or offset. Thus, a vibration transferred to a vibration plate may decrease.

The speaker according to the third embodiment of the present disclosure illustrated in FIG. 8 uses an adhesive member having a low elastic modulus as the first to third adhesive members, and the speaker according to the fourth embodiment of the present disclosure uses an adhesive member having a high elastic modulus as the first adhesive member, and uses an adhesive member having a low elastic modulus as the second and third adhesive members. In each of the speaker according to the third embodiment of the present disclosure (FIG. 8; shown as a diamond-dotted line in FIG. 10) and the speaker according to the fourth embodiment of the present disclosure (FIG. 9; shown as a square-dotted line in FIG. 10), it may be shown that, when piezoelectric member is a bimorph piezoelectric member in which a thickness ratio of a first piezoelectric layer group to a second piezoelectric layer group of a piezoelectric member is close to 1:1, a highest sound pressure level is observed. Because the bimorph piezoelectric member includes a first piezoelectric layer group and a second piezoelectric layer group, which may contract or expand in lengthwise directions opposite to each other, to reduce or minimize the reduction in vibration caused by the first piezoelectric layer group and the second piezoelectric layer group, second and third adhesive members, disposed between first and second reinforcement members adjacent to a piezoelectric member, may use an adhesive member having a low elastic modulus. Thus, a vibration transferred to a vibration plate may increase.

With reference to a result of a sound pressure measurement value of the speaker according to the fourth embodiment of the present disclosure illustrated in FIG. 10, when the first adhesive member is an adhesive member having a high elastic modulus, a vibration generated based on the lengthwise-direction expansion or contraction of a piezoelectric member may be primarily determined through the offset or amplification of the first reinforcement member, the second reinforcement member, the second adhesive member, and the third adhesive member, which are adjacent to the piezoelectric member. Then, when the first adhesive member is an adhesive member having a low elastic modulus, a vibration secondarily transferred to the vibration plate may increase.

Therefore, in the speaker according to an embodiment of the present disclosure, when the piezoelectric member 220 is a unimorph piezoelectric member, it may be shown that, when at least one of first to third adhesive members is an adhesive member having a high elastic modulus, the speaker may realize a high sound pressure level characteristic. For example, an elastic modulus of an adhesive member may be a high-elastic adhesive member having an elastic modulus of 100 MPa to 1,000 MPa. For example, the high-elastic adhesive member may include at least one of a cyanoacrylate-based adhesive, an epoxy-based adhesive, and an acrylate-based adhesive, but is not limited thereto.

Moreover, in the speaker according to an embodiment of the present disclosure, when the piezoelectric member 220 is a bimorph piezoelectric member, it may be seen that, when at least one of first to third adhesive members is an adhesive member having a low elastic modulus, the speaker may realize a high sound pressure level characteristic. For example, an elastic modulus of an adhesive member may be a low-elastic adhesive member having an elastic modulus of 0.1 MPa to 20 MPa. For example, the high-elastic adhesive member may include one or more of: a double-sided tape, acrylate-based adhesive resin, silicone adhesive resin, and polyvinyl alcohol-based resin, but is not limited thereto. The first to third adhesive members may include the same material or different materials, based on a configuration and a design of the speaker according to another embodiment of the present disclosure.

Moreover, when a piezoelectric member of the speaker according to an embodiment of the present disclosure is a bimorph piezoelectric member, a thickness ratio of a first piezoelectric layer group to a second piezoelectric layer group may be within a range of 2:8 to 8:2. When the thickness ratio is outside the range, a sound pressure level characteristic of the speaker according to an embodiment of the present disclosure may be reduced.

Figure 11:
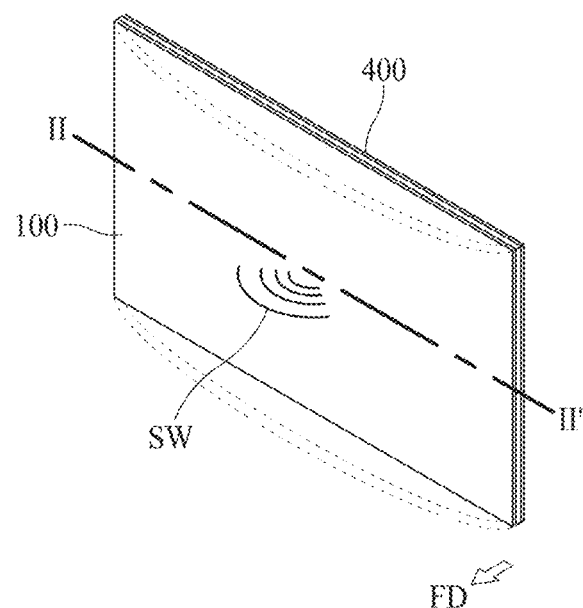
FIG. 11 illustrates a display apparatus according to an embodiment of the present disclosure.
Figure 12:
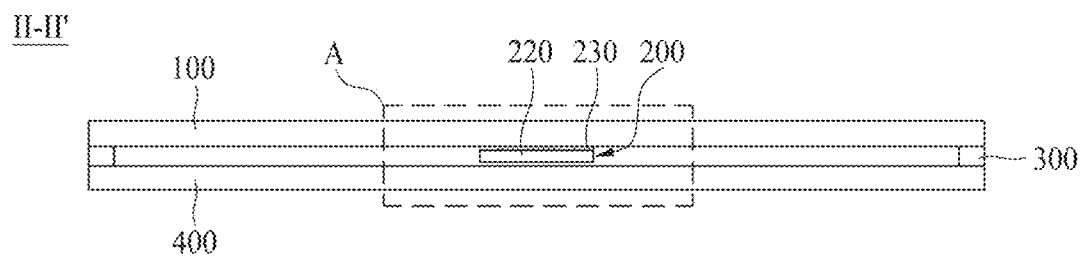
FIG. 12 is a cross-sectional view taken along line II-IF illustrated in FIG. 11.
Figure 13:
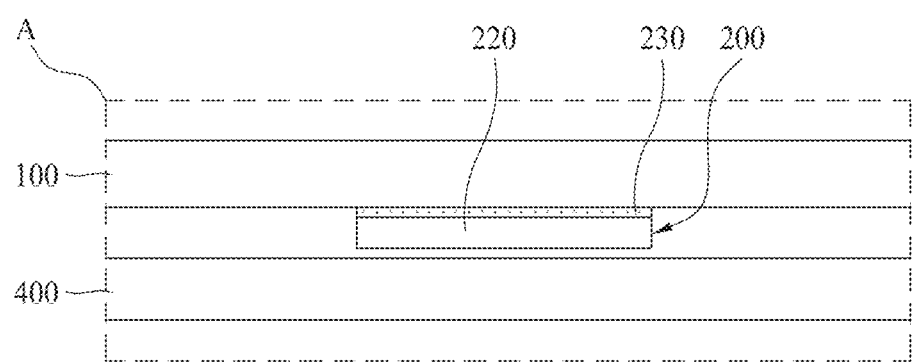
FIG. 13 is an enlarged view of portion 'A' illustrated in FIG. 12.

FIG. 11 illustrates a display apparatus including a speaker according to an embodiment of the present disclosure. FIG. 12 is a cross-sectional view taken along line II-IF illustrated in FIG. 11. FIG. 13 is an enlarged view of portion 'A' illustrated in FIG. 12.

With reference to FIGS. 11 to 13, the display apparatus including the speaker according to an embodiment of the present disclosure may include a speaker 200 on one surface of a display panel 100, and the speaker 200 may include a vibration plate 210, a piezoelectric member 220 on one surface of the vibration plate 210, and an adhesive member 230 between the vibration plate 210 and the piezoelectric member 220. The piezoelectric member 220 may be configured with a single layer or as a multi-layer structure. When the piezoelectric member 220 is a unimorph piezoelectric member, the adhesive member 220 may be a high-elastic adhesive member. When the piezoelectric member 220 is a bimorph piezoelectric member, the adhesive member 220 may be a low-elastic adhesive member.

Alternatively, a display apparatus including a speaker according to another embodiment of the present disclosure may include a speaker 200 on one surface of a display panel 100. The speaker 200 may include a vibration plate, a piezoelectric member on a surface of the vibration plate, a reinforcement member on at least one of an upper surface and a lower surface of the piezoelectric member, and an adhesive member. The adhesive member may have a certain elastic modulus, and may be between the vibration plate and the reinforcement member and between the piezoelectric member and the reinforcement member. The piezoelectric member may be configured with a single layer or as a multi-layer structure. When the piezoelectric member is a unimorph piezoelectric member, a high-elastic adhesive member may be between the vibration plate and the reinforcement member and/or between the piezoelectric member and the reinforcement member. When the piezoelectric member is a bimorph piezoelectric member, a low-elastic adhesive member may be disposed between the vibration plate and the reinforcement member and/or between the piezoelectric member and the reinforcement member.

Moreover, the display apparatus according to an embodiment of the present disclosure may directly vibrate the display panel 100, instead of the vibration plate 210 of the speaker. For example, the display panel 100 may be a vibration plate.

The speaker 200 may vibrate the display panel 100 based on driving (or vibration) of the piezoelectric member. Thus, sound SW generated based on the vibration of the display panel 100 may be output in a forward direction FD with respect to the display panel 100. For example, the vibration plate of the speaker 200 may vibrate by using the piezoelectric member, and the vibration may be transferred to the display panel 100, thereby generating the sound SW. For example, when the speaker 200 generates a sound by using the display panel 100 as a vibration plate, the speaker 200 may be referred to as a "vibration-generating device."

The display panel 100 according to an embodiment of the present disclosure may be implemented as a curved display panel, or as any type of display panel, such as a liquid crystal display panel, an organic light-emitting display panel, a quantum dot light-emitting display panel, a micro light-emitting diode display panel, and an electroluminescent display panel. The display panel 100 is not limited to a specific type of display panel, and may vibrate based on a vibration of a sound generating device to generate a sound wave or sound.

The display panel 100 may include a thin-film transistor (TFT) array substrate, which may include a plurality of pixels defined by a plurality of gate lines and a plurality of data lines and a TFT provided in each of the plurality of pixels for driving a corresponding pixel, an organic light-emitting device layer provided on the TFT array substrate, and an encapsulation substrate covering the organic light-emitting device layer. Here, the encapsulation substrate may protect the TFT and the organic light-emitting device layer from an external impact, and may reduce or prevent water from penetrating into the organic light-emitting device layer.

In the present disclosure, a rear structure 400 may be referred to as a "cover bottom," a "plate bottom," a "back cover," a "base frame," a "metal frame," a "metal chassis," a "chassis base," or an "m-chassis." Therefore, the rear structure 400 may be a supporter for supporting the display panel 100, and may be implemented as any type of frames or a plate structure, each disposed on the rear surface of the display apparatus.

The rear structure 400 according to an embodiment of the present disclosure may include one or more of: a glass material, a metal material, and a plastic material, each having a plate shape covering a whole rear surface of the display panel 100 with a gap space therebetween. Here, an edge or a sharp corner of the rear structure 400 may have a tetragonal (e.g., quadrilateral) shape or a curved shape through a chamfering process or a corner rounding process. For example, the rear structure 400 including the glass material may include sapphire glass. As another example, the rear structure 400 including the metal material may include one or more of: aluminum (Al), an Al alloy, a magnesium (Mg) alloy, and an iron (Fe)-nickel (Ni) alloy. The rear structure 400 according to an embodiment of the present disclosure may be disposed in a rear edge of the display panel 100 by using a panel fixing member 300.

The panel fixing member 300 may be between a rear edge of the display panel 100 and an edge of the rear structure 400, and may attach the display panel 100 to the rear structure 400. The panel fixing member 300 according to an embodiment may be implemented as a double-sided tape or a double-sided adhesive foam pad, but is not limited thereto.

Descriptions of the vibration plate, the piezoelectric member, the reinforcement member, and the adhesive member of the speaker of the display apparatus according to an embodiment of the present disclosure are the same as descriptions of the configuration and effect of the above-described speaker. Thus, their repetitive descriptions are omitted.

According to an embodiment of the present disclosure, a speaker included in a display apparatus may have a high-pitched sound pressure characteristic in a broad sound band including a low-pitched sound band, providing an enhanced sound to a user. The speaker according to an embodiment of the present disclosure may be applied as a speaker provided in a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, televisions (TVs), wallpaper display apparatuses, signage devices, game machines, notebook computers, monitors, cameras, camcorders, home appliances, etc. Also, the speaker according to an embodiment of the present disclosure may be applied to an organic light-emitting lighting apparatuses or inorganic light-emitting lighting apparatuses. When the speaker is applied to a lighting apparatus, the speaker may act as lighting and a speaker. When the speaker is applied to a mobile apparatus or the like, the speaker may act as a speaker or a receiver. However, embodiments of the present disclosure are not limited thereto.

A speaker and a display apparatus according to example embodiments of the present disclosure will be described below.

According to an embodiment of the present disclosure, a speaker may include: a vibration plate, a piezoelectric member on a surface of the vibration plate, and a first adhesive member between the vibration plate and the piezoelectric member. The piezoelectric member may be a unimorph piezoelectric member, and the first adhesive member may have a high elastic modulus. Alternatively, the piezoelectric member may be a bimorph piezoelectric member, and the first adhesive member may have a low elastic modulus.

For example, in the speaker according to an embodiment of the present disclosure, when the piezoelectric member may be a bimorph piezoelectric member: the bimorph piezoelectric member may include: a first piezoelectric layer group, and a second piezoelectric layer group, the first piezoelectric layer group may be configured to expand and contract in a lengthwise direction of the piezoelectric member, and the second piezoelectric layer group may be configured to expand and contract respectively in a direction opposite to the expansion and contraction of the first piezoelectric layer group. For example, in the speaker according to an embodiment of the present disclosure, a thickness ratio of the first piezoelectric layer group to the second piezoelectric layer group may be 2:8 to 8:2.

For example, the speaker according to an embodiment of the present disclosure may further include a reinforcement member one or more of: an upper surface of the piezoelectric member, and a lower surface of the piezoelectric member. For example, the speaker according to an embodiment of the present disclosure may further include a second adhesive member between the reinforcement member and the piezoelectric member.

For example, in the speaker according to an embodiment of the present disclosure, when the piezoelectric member is the unimorph piezoelectric member, the second adhesive member may have a high elastic modulus, and when the piezoelectric member is the bimorph piezoelectric member, the second adhesive member may have a low elastic modulus. For example, in the speaker according to an embodiment of the present disclosure, an elastic modulus of the high elastic modulus may be 25 MPa or more, and an elastic modulus of the low elastic modulus may be 0.1 MPa to 20 MPa.

According to an embodiment of the present disclosure, a speaker may include: a piezoelectric member, a first reinforcement member on an upper surface of the piezoelectric member, a second reinforcement member on a lower surface of the piezoelectric member, a first adhesive member between the first reinforcement member and the piezoelectric member, and a second adhesive member between the second reinforcement member and the piezoelectric member. When the piezoelectric member is a unimorph piezoelectric member, at least one of the first adhesive member and the second adhesive member may have a high elastic modulus. When the piezoelectric member is a bimorph piezoelectric member, at least one of the first adhesive member and the second adhesive member may have a low elastic modulus.

For example, in the speaker according to an embodiment of the present disclosure, the adhesive member having the high elastic modulus may include one or more of: a cyanoacrylate-based adhesive, an epoxy-based adhesive, and an acrylate-based adhesive. For example, in the speaker according to an embodiment of the present disclosure, an elastic modulus of the high elastic modulus may be 100 MPa to 1,000 MPa.

For example, in the speaker according to an embodiment of the present disclosure, the adhesive member having the low elastic modulus may include one or more of: a double-sided tape, acrylate-based adhesive resin, silicone adhesive resin, and polyvinyl alcohol-based resin. For example, in the speaker according to an embodiment of the present disclosure, an elastic modulus of the low elastic modulus may be 0.1 MPa to 20 MPa.

According to an embodiment of the present disclosure, a speaker may include: a vibration plate, a piezoelectric member on a surface of the vibration plate, a reinforcement member on at least one of an upper surface and a lower surface of the piezoelectric member, and an adhesive member in at least one of a portion between the vibration plate and the reinforcement member and a portion between the piezoelectric member and the reinforcement member, the adhesive member having a certain elastic modulus. A vibration generated by the piezoelectric member may be transferred to the vibration plate.

For example, in the speaker according to an embodiment of the present disclosure, the piezoelectric member may be a unimorph piezoelectric member, and the adhesive member may be a high-elastic adhesive member. For example, in the speaker according to an embodiment of the present disclosure, an elastic modulus of the high-elastic adhesive member may be 100 MPa to 1,000 MPa.

For example, in the speaker according to an embodiment of the present disclosure, the piezoelectric member may be a bimorph piezoelectric member, and the adhesive member may be a low-elastic adhesive member. For example, in the speaker according to an embodiment of the present disclosure, an elastic modulus of the low-elastic adhesive member may be 0.1 MPa to 20 MPa.

According to an embodiment of the present disclosure, a display apparatus may include: a display panel configured to display an image, and the speaker according to an embodiment of the present disclosure, configured to vibrate the display panel to generate sound.

According to an embodiment of the present disclosure, a display apparatus may include: a display panel configured to display an image, and a speaker on a rear surface of the display panel, the speaker being configured to vibrate the display panel to generate sound, the speaker including: a piezoelectric member, a reinforcement member on at least one of an upper surface of the piezoelectric member and a lower surface of the piezoelectric member, and an adhesive member in at least one of: a portion between the display panel and the reinforcement member, and a portion between the piezoelectric member and the reinforcement member.

For example, in the display apparatus according to an embodiment of the present disclosure, the speaker further may include a vibration plate, and the piezoelectric member may be on a rear surface of the vibration plate. For example, in the display apparatus according to an embodiment of the present disclosure, a vibration of the piezoelectric member may be configured to vibrate the display panel.

For example, in the display apparatus according to an embodiment of the present disclosure, the piezoelectric member may be a unimorph piezoelectric member, and the adhesive member may have an elastic modulus in a range of 100 MPa to 1,000 MPa. For example, in the display apparatus according to an embodiment of the present disclosure, the piezoelectric member may be a bimorph piezoelectric member, and the adhesive member may have an elastic modulus in a range of 0.1 MPa to 20 MPa.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A speaker, comprising:
    a vibration plate;
    a first adhesive member on the vibration plate;
    a first reinforcement member on the first adhesive member;
    a second adhesive member on the first reinforcement member;
    a piezoelectric member on the second adhesive member;

a third adhesive member on the piezoelectric member; and
a second reinforcement member on the third adhesive member,
wherein the piezoelectric member is a unimorph piezoelectric member,
wherein one of the second adhesive member and the third adhesive member has a high elastic modulus of 25 MPa or more, and
wherein the other of the second adhesive member and the third adhesive member has a low elastic modulus of 0.1 MPa to 20 MPa.

2. The speaker of claim 1, wherein the adhesive member having the high elastic modulus comprises one or more of: a cyanoacrylate-based adhesive, an epoxy-based adhesive, and an acrylate-based adhesive.

3. The speaker of claim 2, wherein an elastic modulus of the high elastic modulus is 100 MPa to 1,000 MPa.

4. The speaker of claim 1, wherein the adhesive member having the low elastic modulus comprises one or more of: a double-sided tape, acrylate-based adhesive resin, silicone adhesive resin, and polyvinyl alcohol-based resin.

5. A speaker, comprising:
a vibration plate;
a first adhesive member on the vibration plate;
a first reinforcement member on the first adhesive member;
a second adhesive member on the first reinforcement member;
a piezoelectric member on the second adhesive member;
a third adhesive member on the piezoelectric member; and
a second reinforcement member on the third adhesive member,
wherein the piezoelectric member is a bimorph piezoelectric member,
wherein the second adhesive member has a low elastic modulus of 0.1 MPa to 20 MPa,
wherein the third adhesive member has a low elastic modulus of 0.1 MPa to 20 MPa, and
wherein a vibration generated by the piezoelectric member is transferred to the vibration plate.

6. The speaker of claim 5, wherein:
the first adhesive member has a high-elastic modulus; and
an elastic modulus of the high-elastic adhesive member is 25 MPa or more.

7. A display apparatus, comprising:
a display panel configured to display an image; and
a speaker on a rear surface of the display panel, the speaker being configured to vibrate the display panel to generate sound, the speaker comprising:
a first adhesive member on the display panel;
a first reinforcement member on the first adhesive member;
a second adhesive member on the first reinforcement member;
a piezoelectric member on the second adhesive member,
wherein the piezoelectric member is a unimorph piezoelectric member,
wherein at least one of the second adhesive member and the third adhesive member has a high elastic modulus of 25 MPa or more, and
wherein the other of the second adhesive member and the third adhesive member has a low elastic modulus of 0.1 MPa to 20 MPa.

8. The display apparatus of claim 7, wherein:
the speaker further comprises a vibration plate; and
the piezoelectric member is on a rear surface of the vibration plate.

9. The display apparatus of claim 7, wherein a vibration of the piezoelectric member is configured to vibrate the display panel.

10. The display apparatus of claim 7, wherein an elastic modulus of the high elastic modulus is in a range of 100 MPa to 1,000 MPa.

11. A display apparatus, comprising:
a display panel configured to display an image; and
a speaker on a rear surface of the display panel, the speaker being configured to vibrate the display panel to generate sound, the speaker comprising:
a first adhesive member on the display panel;
a first reinforcement member on the first adhesive member;
a second adhesive member on the first reinforcement member;
a piezoelectric member on the second adhesive member;
a third adhesive member on the piezoelectric member; and
a second reinforcement member on the third adhesive member,
wherein the piezoelectric member is a bimorph piezoelectric member, and
wherein the second adhesive member and the third adhesive member has a low elastic modulus of 0.1 MPa to 20 MPa.

12. The speaker of claim 11, wherein:
the first adhesive member has a high-elastic modulus; and
an elastic modulus of the high-elastic adhesive member is 25 MPa or more.

* * * * *